United States Patent
Grimm et al.

(10) Patent No.: US 7,229,127 B2
(45) Date of Patent: Jun. 12, 2007

(54) SHIFTING MECHANISM FOR A SLIDING-TILTING ROOF

(75) Inventors: Rainer Grimm, Frankfurt (DE); Horst Böhm, Frankfurt (DE); Claudia Riess, Lichtenberg (DE); Manfred Roehnke, Roedermark (DE)

(73) Assignee: ArvinMeritor GmbH, Dietzenbach (DE)

( * ) Notice: Subject to any disclaimer, the term of this patent is extended or adjusted under 35 U.S.C. 154(b) by 0 days.

(21) Appl. No.: 10/997,481

(22) Filed: Nov. 24, 2004

(65) Prior Publication Data

US 2005/0110307 A1 May 26, 2005

(30) Foreign Application Priority Data

Nov. 24, 2003 (DE) ................. 103 54 832

(51) Int. Cl.
*B60J 7/057* (2006.01)
(52) U.S. Cl. .................. 296/223; 296/216.03
(58) Field of Classification Search .......... 296/216.03, 296/223, 224
See application file for complete search history.

(56) References Cited

U.S. PATENT DOCUMENTS

| | | | |
|---|---|---|---|
| 5,069,501 A | * | 12/1991 | Baldwin et al. ............ 296/223 |
| 5,405,185 A | | 4/1995 | Cheron et al. |
| 5,632,523 A | * | 5/1997 | Kelm ......................... 296/223 |
| 6,158,803 A | | 12/2000 | Reihl et al. |
| 2005/0023868 A1 | * | 2/2005 | Ettl et al. ................... 296/223 |

FOREIGN PATENT DOCUMENTS

| | | |
|---|---|---|
| DE | 298 11 016 U1 | 10/1999 |
| DE | 100 09 387 C1 | 5/2001 |
| DE | 101 46 284 A1 | 4/2003 |
| DE | 102 05 612 A1 | 8/2003 |
| EP | 0 638 452 A1 | 2/1995 |
| JP | 0131816 * | 6/1987 ............... 296/223 |

OTHER PUBLICATIONS

European Search Report, Apr. 1, 2005.

* cited by examiner

*Primary Examiner*—Dennis H. Pedder
(74) *Attorney, Agent, or Firm*—Carlson, Gaskey & Olds

(57) ABSTRACT

A sliding mechanism for a vehicle roof includes least one guide rail, a carriage that can be shifted in the guide rail, and a cover support provided to bear a cover of a sliding-tilting roof. The carriage guides the movements of the cover support and includes a lifting slot, a guiding slot and a latching slot.

22 Claims, 16 Drawing Sheets

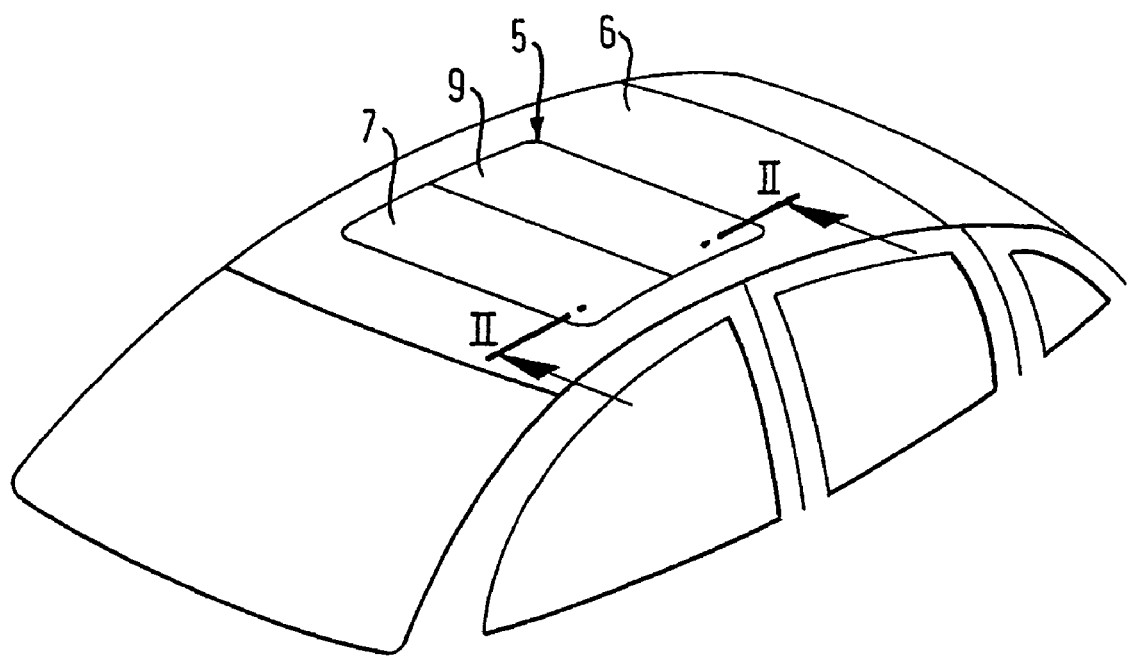

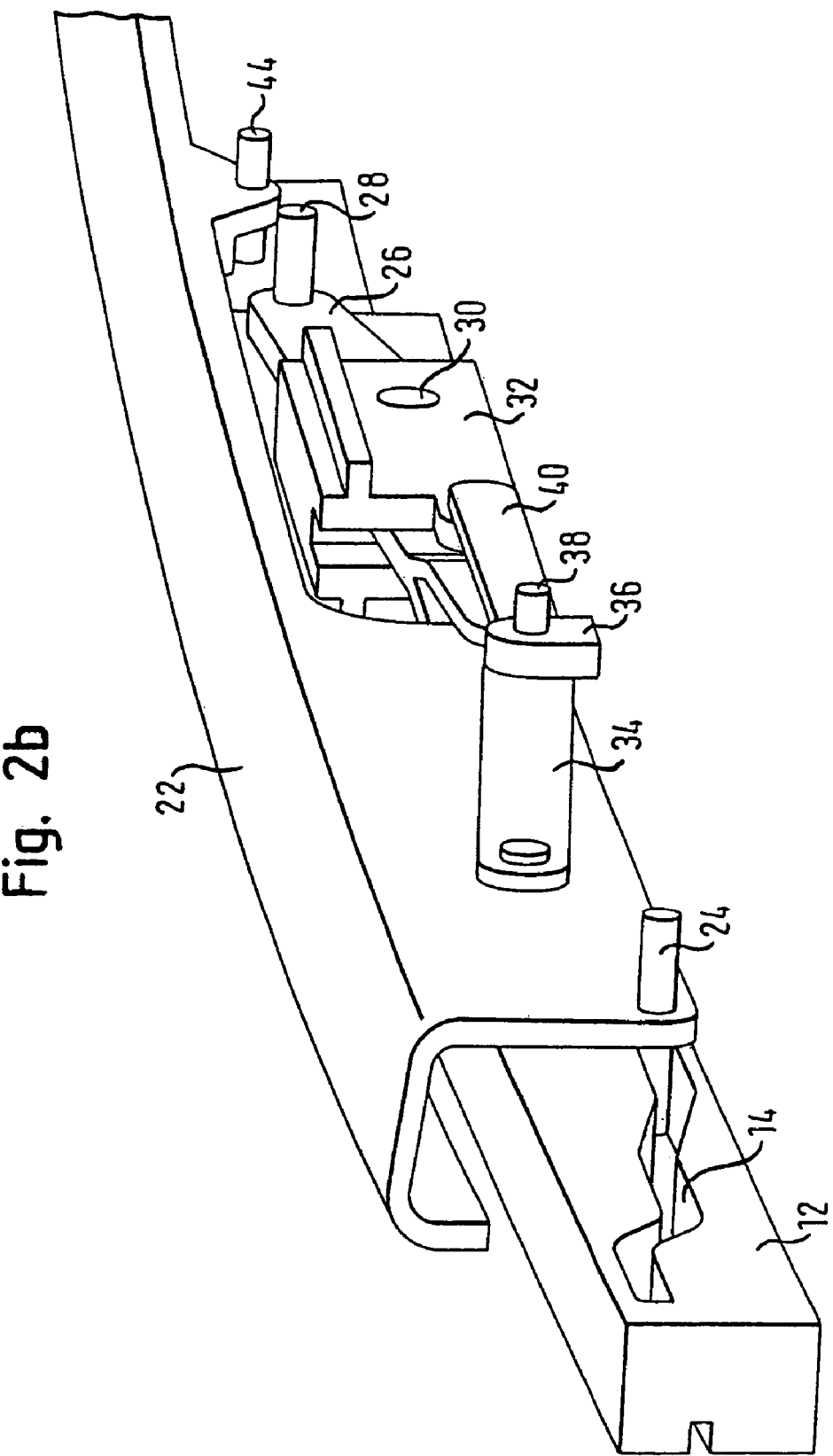

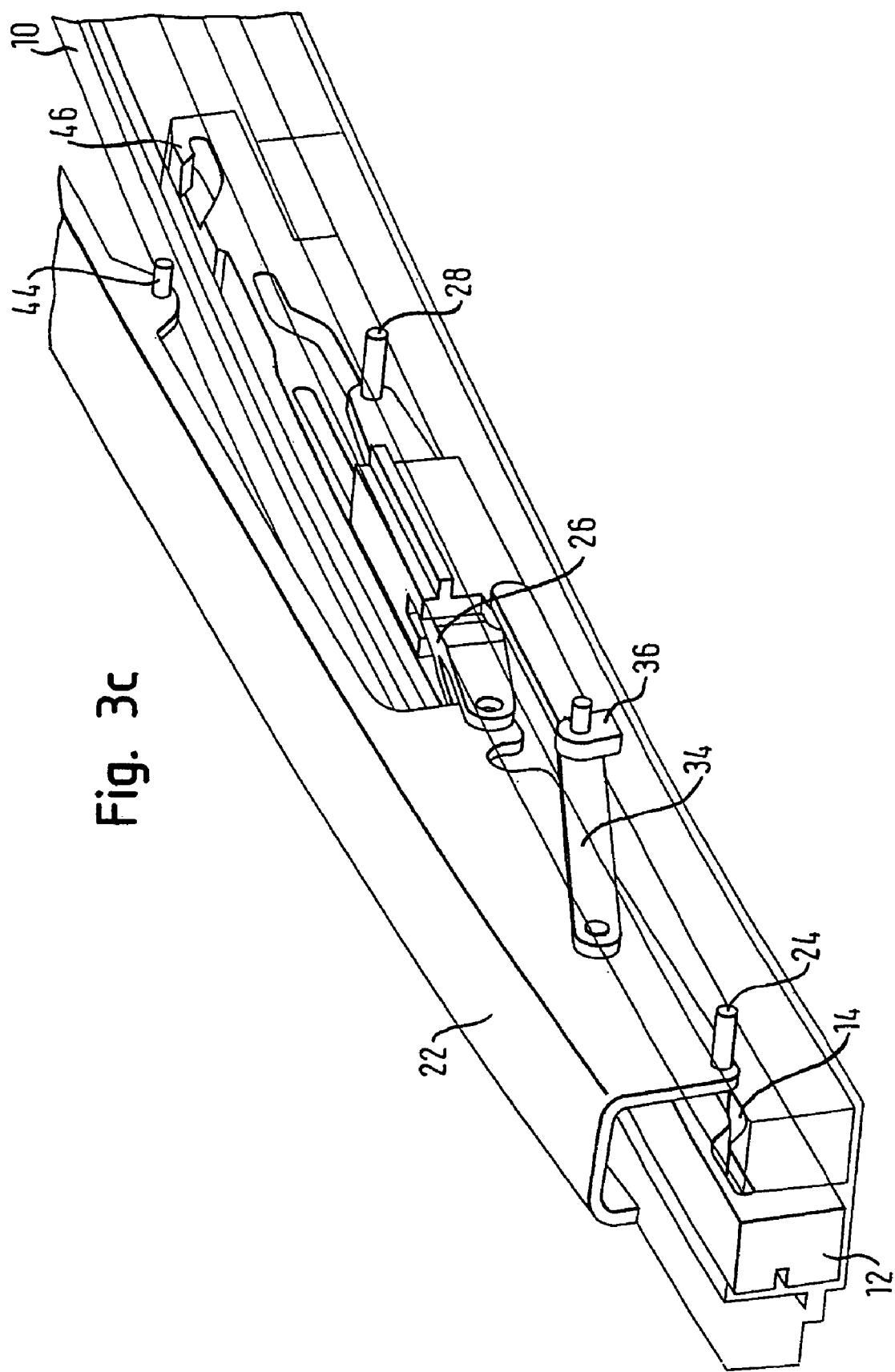

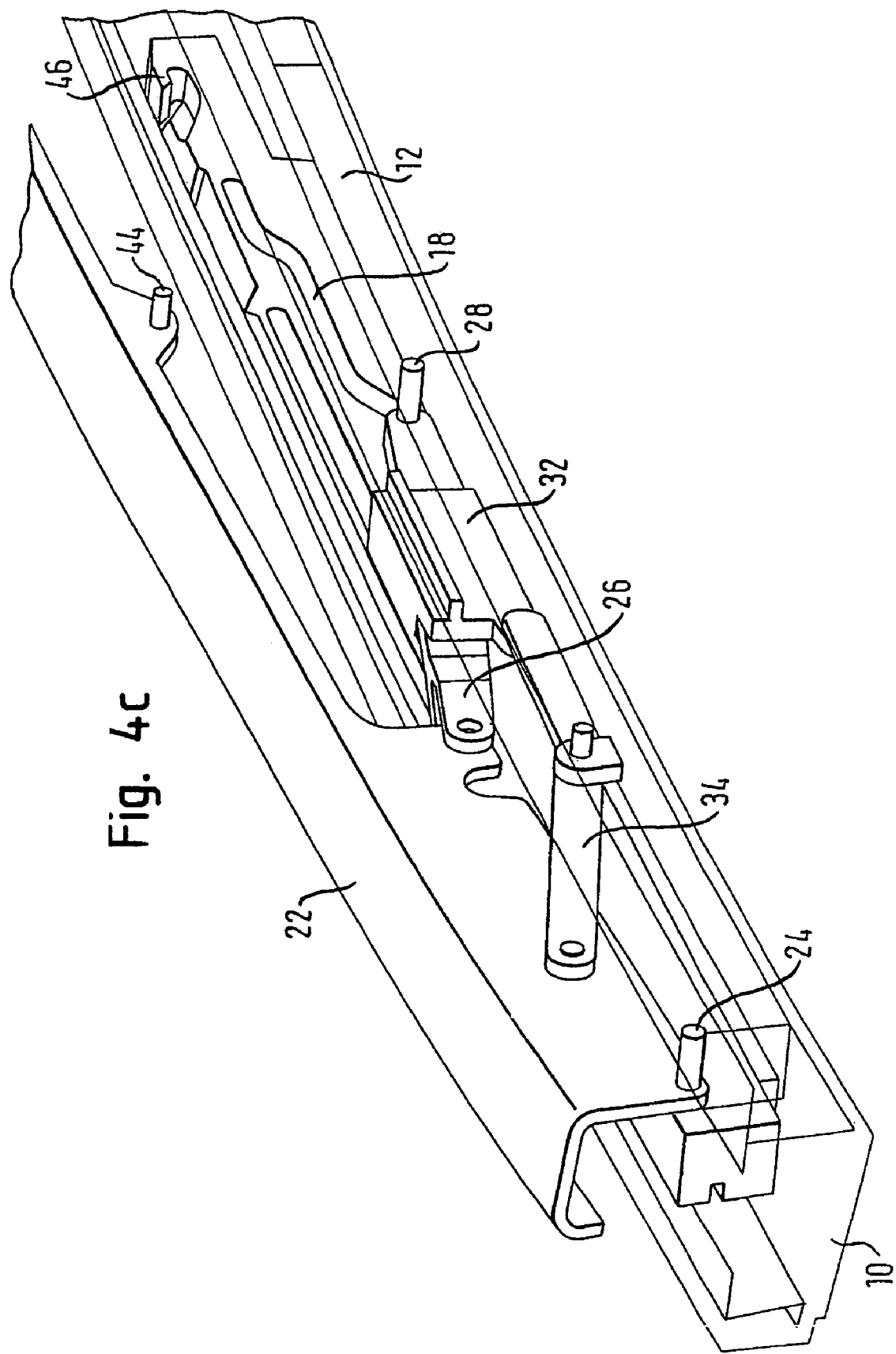

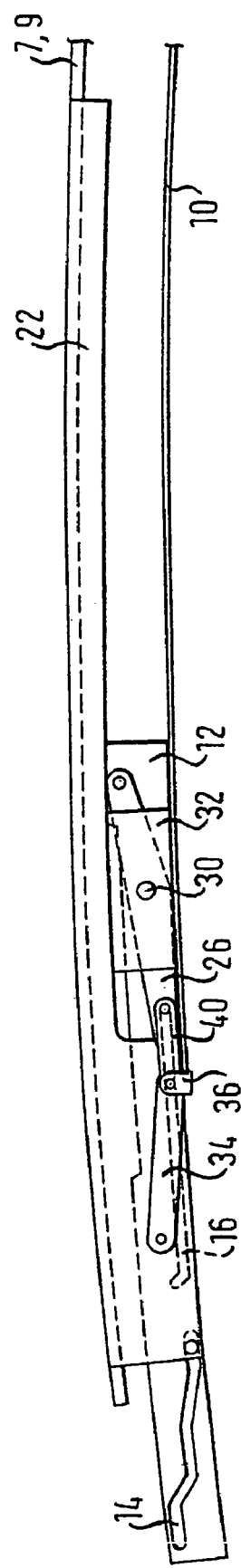

SHIFTING MECHANISM FOR A SLIDING-TILTING ROOF

REFERENCE TO RELATED APPLICATIONS

The present invention claims the benefit of German Patent Application No. 103 54 832.7, filed Nov. 24, 2003.

TECHNICAL FIELD

The invention relates to a sliding-tilting roof for a motor vehicle, and in particular a mechanism for shifting a cover of a sliding-tilting roof.

BACKGROUND OF THE INVENTION

A multitude of various sliding-tilting vehicle roof mechanisms for shifting a single cover or several covers of a sliding-tilting roof are known in the prior art. Currently-known mechanisms share a common feature in that they lift the cover toward the outside of the vehicle and then move the cover toward the rear of the vehicle to partially or completely open a vehicle roof opening. These mechanisms, however, occupy a large amount of vehicle space because they contain multiple components for moving the roof, causing the tolerances of the multiple components to accumulate.

There is a desire for a sliding-tilting roof mechanism that has a mechanically simple construction and occupies limited vehicle space.

SUMMARY OF THE INVENTION

The invention is generally directed to an assembly comprising at least one guide rail, a carriage that can be shifted in the guide rail, and a cover support that bears a cover of a sliding-tilting roof for a motor vehicle. The carriage has a lifting slot, a guiding slot and a latching slot. The assembly combines all the slots needed to actuate the cover support within the single carriage. By doing so, the assembly establishes a very precise function and at the same time can be manufactured using the single carriage, resulting in low production costs and low tolerances.

In one embodiment, the assembly includes a single carriage that may be injection-molded. The injection mold used to mold the carriage can be manufactured with very high precision so that the slots arranged in the carriage will likewise be arranged relative to each other with correspondingly high precision. Because all of the shifting movements in the cover support are conducted by one single component, namely the carriage, the inventive assembly does not encounter any problems caused by accumulation of tolerances from multiple components.

Advantageous embodiments will be apparent from the sub-claims.

BRIEF DESCRIPTION OF THE DRAWINGS

The invention will be explained in the following with the aid of various embodiments illustrated in the attached drawings in which FIG. 1 shows a perspective view of a sliding-tilting roof of a motor vehicle;

FIGS. 2a to 2c show a side view, a perspective view with the guide rail omitted, and another perspective view of a mechanism according to a first embodiment of the invention with the sliding-tilting roof being in the closed position;

FIGS. 3a to 3c illustrates views corresponding to those of FIGS. 2a to 2c with the mechanism in a partially raised state;

FIGS. 4a to 4c illustrates views corresponding to those of FIGS. 2a to 2c with the mechanism in a fully raised state;

FIG. 5 shows a side view of a mechanism of a sliding-tilting roof according to a second embodiment where the mechanism is in the closed position;

DETAILED DESCRIPTION OF THE EMBODIMENTS

Figure 2A:
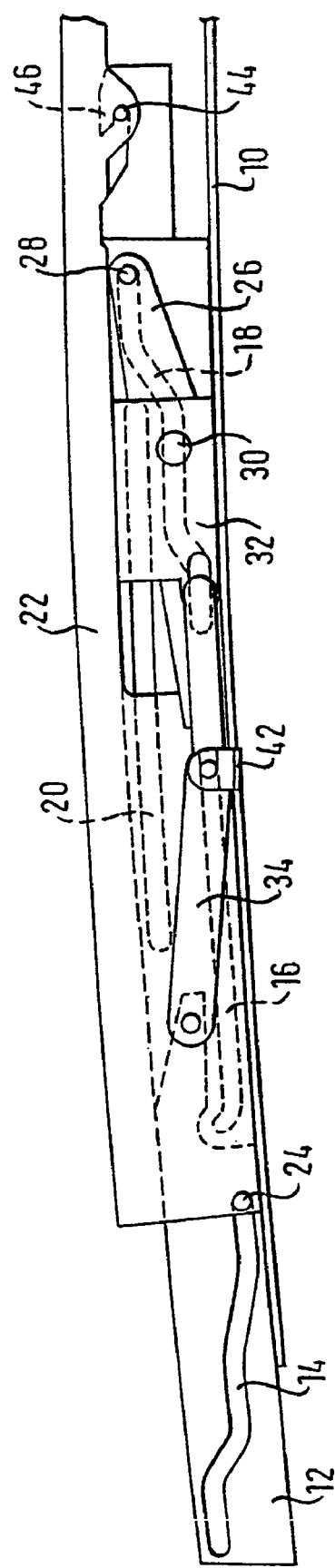

FIG. 1 illustrates a sliding-tilting roof 5 for a vehicle roof 6. The sliding-tilting roof 5 includes a first cover 7 and a second cover 9. The first cover 7 and the second cover 9 can both be lifted toward the outside or exterior of the vehicle from the position shown in FIG. 1 and shifted toward the rear of the vehicle to partially or fully expose a roof opening in the vehicle roof 6.

The mechanism of the sliding-tilting roof 5 will now be described with respect to FIGS. 2a through 2c. In so doing, reference will be made only to the mechanism that is arranged on the right-hand side with respect to FIG. 1. The mechanism arranged on the other side of the roof is a mirror image of the mechanism described below. In addition, the side of the mechanism described below does not show those components that would be present due to the mirror image construction, for clarity.

The mechanism has a guide rail 10 extending approximately in a longitudinal direction of the vehicle along the edge of the roof opening. A carriage 12 is movably arranged in the guide rail 10, of which only one side is shown in the figures. The opposite side (i.e., in the figures, the side other than the side oriented toward the observer) of the carriage 12 is configured to be a mirror image of the side that is shown in the figures.

The carriage 12 can be shifted along the guide rail 10 in any manner, for instance by an electric motor (not shown) that is coupled with the carriage 12 through a cable (not shown). The carriage 12 has a guiding slot 14, a latching slot 16, and a lifting slot 18 as well as a support glider groove 20. All the slots 14, 16, 18 and the support glider groove 20 can be configured in a simple manner as recessed areas in the carriage 12. The carriage 12 itself can be made from injection molded plastic or other material that can form the carriage configuration.

The guiding slot 14 is disposed at the front end of the carriage 12 with respect to the direction of travel of the carriage 12. When the guiding slot 14 is viewed from the rear toward the front, the guiding slot 14 has a comparably short starting section extending approximately parallel to the longitudinal direction of the guide rail 10, a comparably smoothly ascending raising section adjoining the starting section, a short intermediate section extending approximately parallel to the longitudinal direction of the guide rail 10 and adjoining the raising section, a comparably steeply ascending lifting section adjoining the intermediate section, and an end section extending approximately parallel to the longitudinal direction of the guide rail 10 and adjoining the lifting section. In other words, the guiding slot 14 has a step-wise ascending profile, as seen from the rear toward the front, with an obliquely extending transition being provided between each step.

The latching slot 16, again as seen from the rear towards the front, includes a comparably long lost motion section extending approximately parallel to the longitudinal direction of the guide rail 10 and a lifting section ascending in upward direction and adjoining the lost motion section.

The lifting slot 18 has, again as seen from the rear toward the front, a starting section extending approximately parallel to the longitudinal direction of the guide rail 10, a first lifting section extending in downward direction and adjoining the starting section, an intermediate section extending approximately parallel to the longitudinal direction of the guide rail and adjoining the first lifting section, a second lifting section that extends further in downward direction and adjoining the intermediate section, and an end section extending approximately parallel to the longitudinal direction of the guide rail 10 and adjoining the second lifting section. In other words, the lifting slot 18 approximates a mirror-image configuration relative to the guiding slot 14.

The support glider groove 20 extends in a straight line and approximately parallel to the longitudinal direction of the guide rail 10.

The mechanism has a cover support 22 to which at least one of the first cover 7 and the second cover 9 of the sliding-tilting roof 5 can be attached. At the front end of the cover support 22, as seen in the direction of travel, the cover support 22 has a guide pin 24 that engages the guiding slot 14. The cover support 22 is connected with the lifting slot 18 through a lifting lever 26. The lifting lever 26 engages the lifting slot 18 with a lifting pin 28. At its opposite end, the lifting lever 26 is articulated on the cover support 22 while being centrally supported in a support glider 32 by a support bolt 30. The support glider 32 is movably guided in the guide rail 10 and also engages the support glider groove 20 of the carriage 12. The lifting lever 26 acts as a two-armed lever, similar to a rocker, because the lifting lever 26 is rotatably mounted between its two ends by the support bolt 30.

A coupling lever 34 has one of its two ends attached to the cover support 22. The opposite end of the coupling lever 34 is pivotally coupled with a latching hook 36, which is provided with a latching pin 38. The latching pin 38 engages the latching slot 16 of the carriage 12. The latching hook 36 is pivotally connected with the support glider 32 through a pivoting lever 40, with the connection being conducted by an elongated hole. Thus, the pivoting lever 40 is only mounted in a vertical direction, permitting shifting along the longitudinal direction of the guide rail 10. In the position shown in FIG. 2a, the latching hook 36 engages a latching recess 42 in the guide rail 10. In this way, the latching hook 36 is held in the longitudinal direction of the guide rail 10.

Finally, the cover support 22 is connected with the carriage 12 through two locking elements, such as a locking bolt 44 arranged on the cover support 22. In this example, the locking bolt 44 is engaged by a locking hook 46, as seen in the direction of travel, is arranged behind the coupling lever 34 and the lifting lever 26.

Figure 2C:
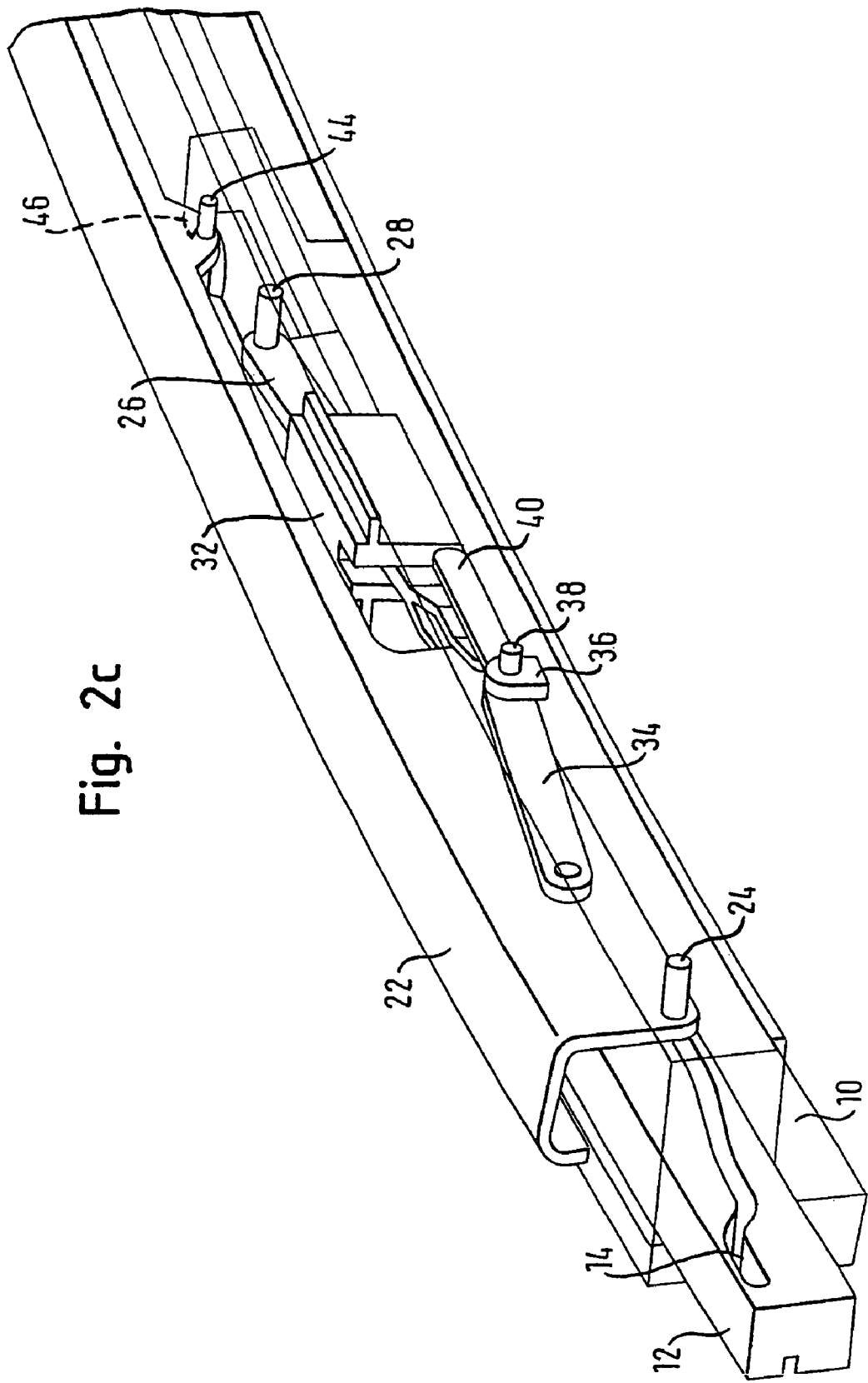

In the operating state shown in FIGS. 2a to 2c, the cover support 22 is reliably held in the position shown in the figures, which corresponds to the closed state of the first cover 7 and/or second cover 9. More particularly, the carriage 12 retains the cover support 22 by means of the guide pin 24 engaging in the guiding slot 14 and by means of the locking bolt 44 engaging behind the locking hook 46. The locking hook 46 is in turn immovably held in the guide rail 10 by means of the drive mechanism associated to the carriage 12. The carriage 12 therefore reliably retains the cover support 22 against movement in the vertical direction. Movement of the cover support 22 along the longitudinal direction is also blocked because the cover support 22 is coupled with the latching hook 36 through the coupling lever 34 and the latching hook 36 itself is held by the latching recess 42. The latching pin 38 engages the latching slot 16 of the latching hook 36 and ensures that the latching hook 36 can not leave the latching recess 42.

Figure 3A:
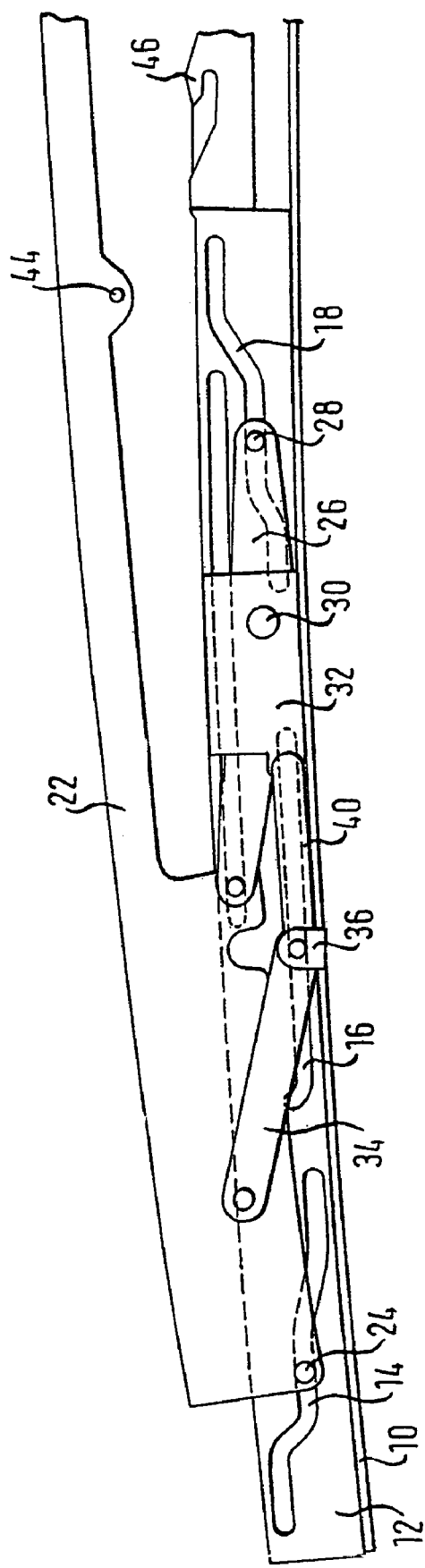
Figure 3B:
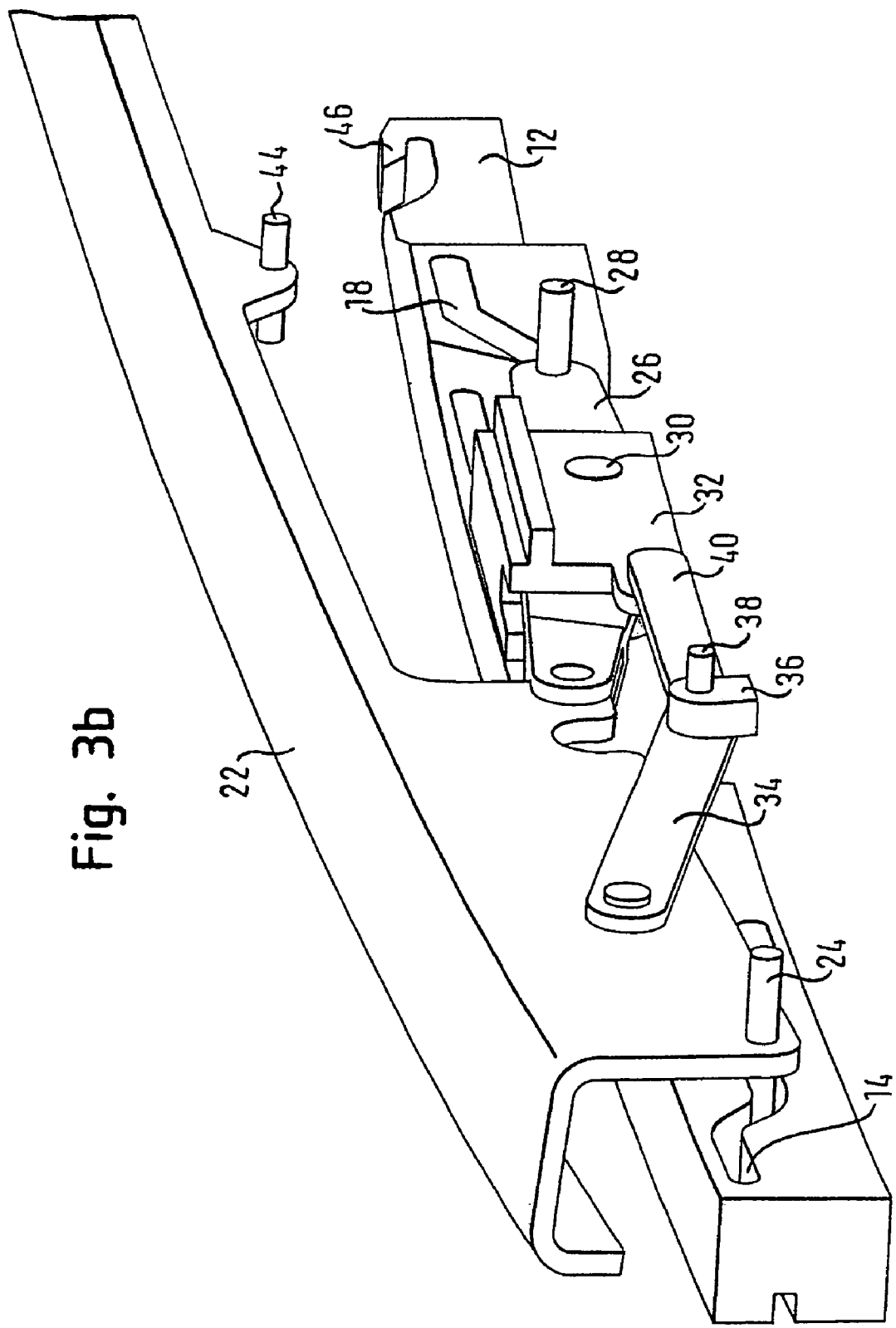
Figure 4A:
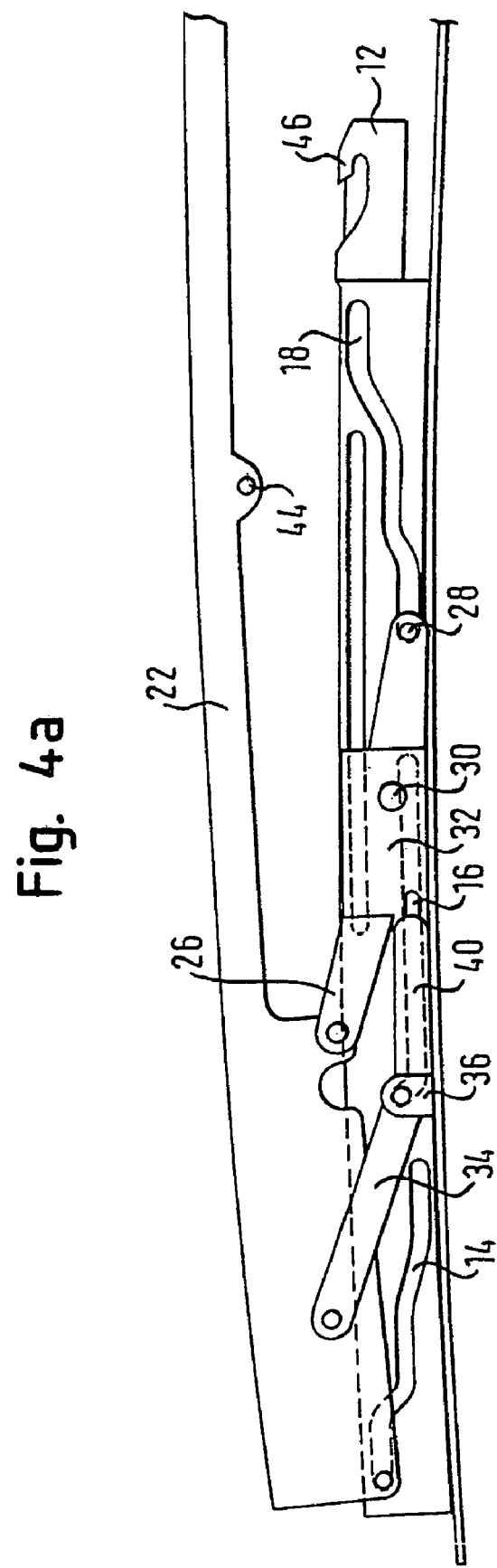
Figure 4B:
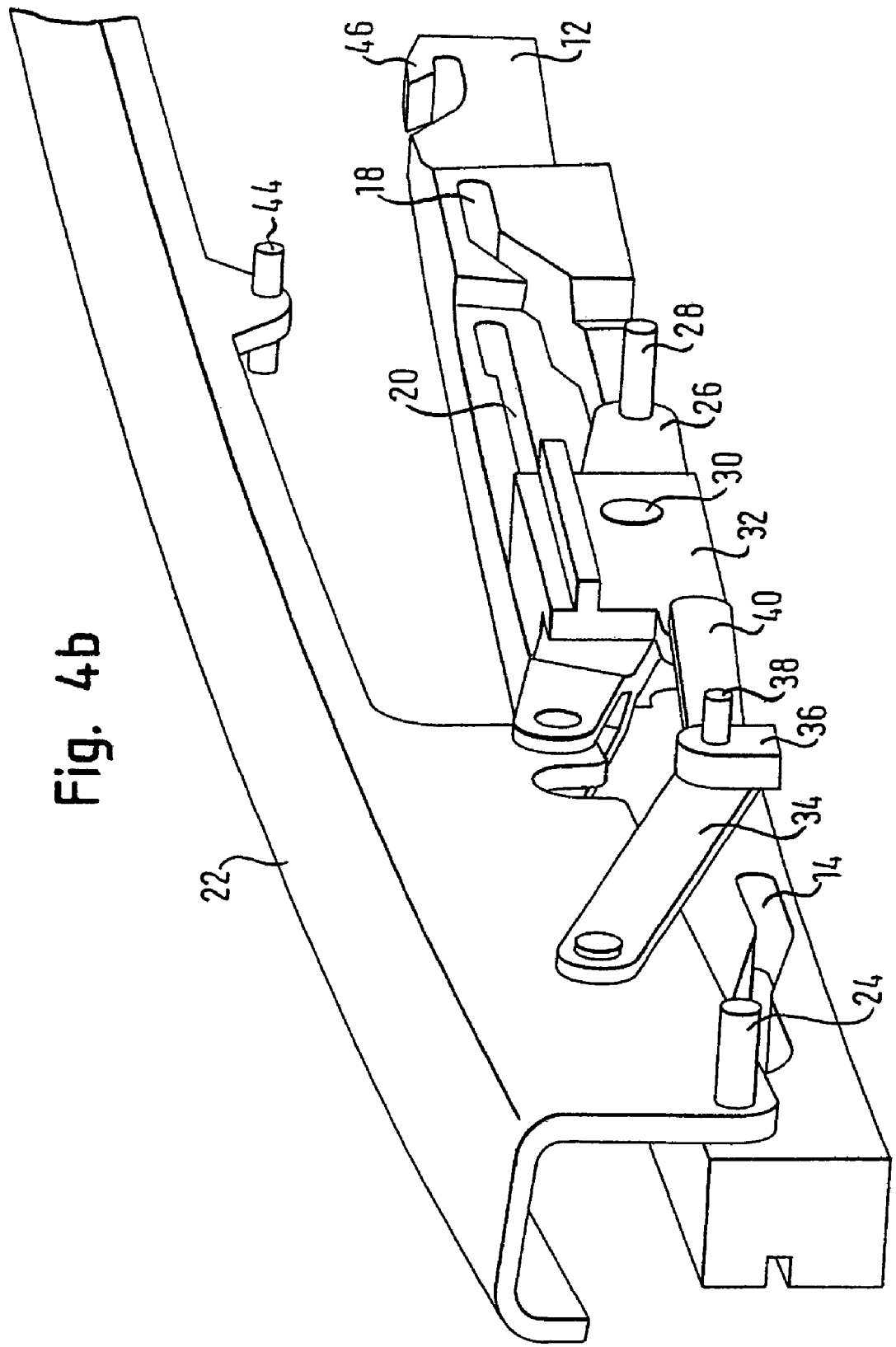

In order to transfer the cover support 22 and hence the cover 7, 9 fixed to it to a partially open position (i.e., a venting position), the carriage 12 is shifted to the right with respect to the figures (i.e., toward the rear of the vehicle) in this example. The position of the carriage 12 associated with the venting position is shown in FIGS. 3a to 3c. When the carriage is transferred from the position shown in FIGS. 2a through 2c to the position shown in FIGS. 3a through 3c, the locking bolt 44 will first be released by the locking hook 46. As seen along the longitudinal direction of the guide rail 10, the cover support 22 will remain securely in the partially open position because the cover support 22 remains firmly held in the longitudinal direction on the guide rail 10 through the coupling lever 34, the latching hook 36 and the latching recess 42.

When the carriage 12 is shifted relative to the cover support 22, the lifting pin 28 slides out of the starting section of the lifting slot 18 into the intermediate section, which is disposed at a slightly lower position. As a result, the lifting lever 26 swivels about the support bolt 30, and the opposite end of the lifting lever 26 (and correspondingly the cover support 22 articulated thereon) moves upwards. At the same time, the guide pin 24 is moved via the raising section out of the starting section of the guiding slot 14 and in an upward direction into the intermediate section. Consequently, the front end of the cover support 22 will likewise be moved upwards. During this upwardly-directed raising movement of the cover support 22, the position of the cover support 22 along the longitudinal direction of the guide rail 10 is solely defined by the coupling lever 34, whose right-hand end (with respect to the figures) is held immobile by the latching hook 36. As the cover support 22 is moved upward as a whole and the coupling lever 34 moves clockwise, the cover support 22 moves slightly towards the rear (i.e., to the right with respect to the figures). The guide, which is in the form of an elongated hole between the pivoting lever 40 of the latching hook 36 and the support glider 32 in this example, prevents the various components from jamming relative to each other.

The position of the cover support 22 is precisely defined also in the venting position, assuming that the carriage 12 is immovably held by its drive mechanism. In the vertical direction, the cover support 22 is precisely positioned by the guiding slot 14 and through the lifting slot 18 together with the lifting lever 26 and the support glider 32. The position along the longitudinal direction of the guide rail 10 is defined by the coupling lever 34, the latching hook 36 and the latching recess 42.

In order to move the cover support 22 into a fully open position, the cover support 22 first needs to be lifted upward and outward to its fullest extent. To accomplish this, the carriage 12 is further shifted to the rear with respect to the vehicle (i.e. to the right with respect to the figures). During this process, the guide pin 24 in the guiding slot 14 and the lifting pin 28 in the lifting slot 18 each arrive at the end section of their respective slots, moving the cover support 22 upward to its full extent. As soon as the guide pin 24 and the lifting pin 28 are at the beginning of their corresponding end sections, the latching pin 38 enters the lifting section of the latching slot 16, pulling the latching hook 36 out of the latching recess 42 in an almost vertical direction. The slight swiveling component of the movement in the latching hook 36 may be disregarded due to the comparably long pivoting lever 40.

The various slots of the carriage 12 are arranged with respect to each other such that the guide pin 24, the lifting pin 28 and the latching pin 38 reach the ends of their corresponding slots roughly at the same time. In this state, the cover support 22 has its maximum raising extent while it is movable in the longitudinal direction, because the latching hook 36 is fully pulled out of the latching recess 42. If the carriage 12 is shifted further toward the rear of the vehicle at this point, it entrains the cover support 22 and the cover 7, 9 attached to the cover support 22.

To close the cover 7, 9, the carriage 12 is shifted in the opposite direction (i.e., toward the front of the vehicle). In so doing, the cover support 22 is entrained via the coupling lever 34 by the latching hook 36 and the latching slot 16. The latching pin 38 disposed in the lifting section of the latching slot 16 is acted upon by the lifting section of the latching slot 16 toward the front of the vehicle and in downward direction. The downward movement has no effect on any part of the assembly as long as the latching hook 36 has not reached the latching recess 42; in its lifted state, the latching hook is supported by the bottom of the guide rail 10. In one example, a component directed toward the front of the vehicle during the downward movement provides for the shifting of the cover support 22.

As soon as the latching hook 36 has reached the latching recess 42, the latching hook 36 is swiveled in the downward direction into the latching recess 42 by the lifting section of the latching slot 16, where the cover support 22 is held in the longitudinal direction via the coupling lever 34. If the carriage 12 continues to be shifted, there will occur a relative movement between the guiding slot 14 and the lifting slot 18 on the one hand, and between the guide pin 24 and the lifting pin 28 on the other hand. The cover 7, 9 will thereby be closed again until the locking hook 46 finally engages the locking bolt 44, placing the mechanism in its initial position.

Figure 6:
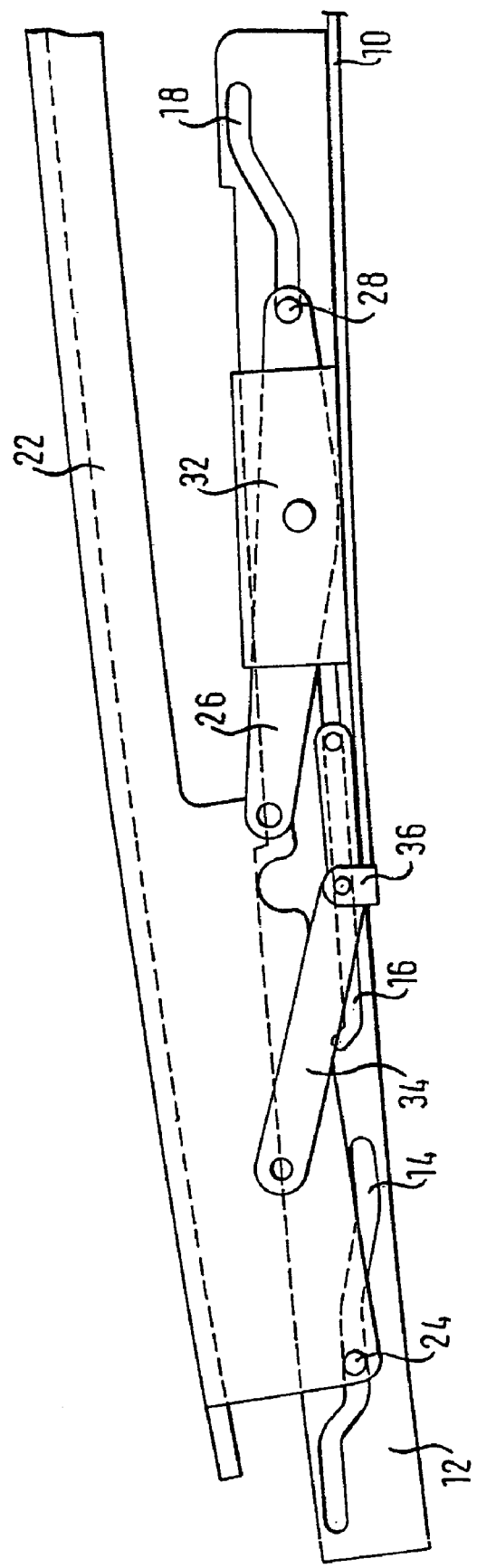
FIG. 6 shows the mechanism of FIG. 5 in a partially open position.
Figure 7:
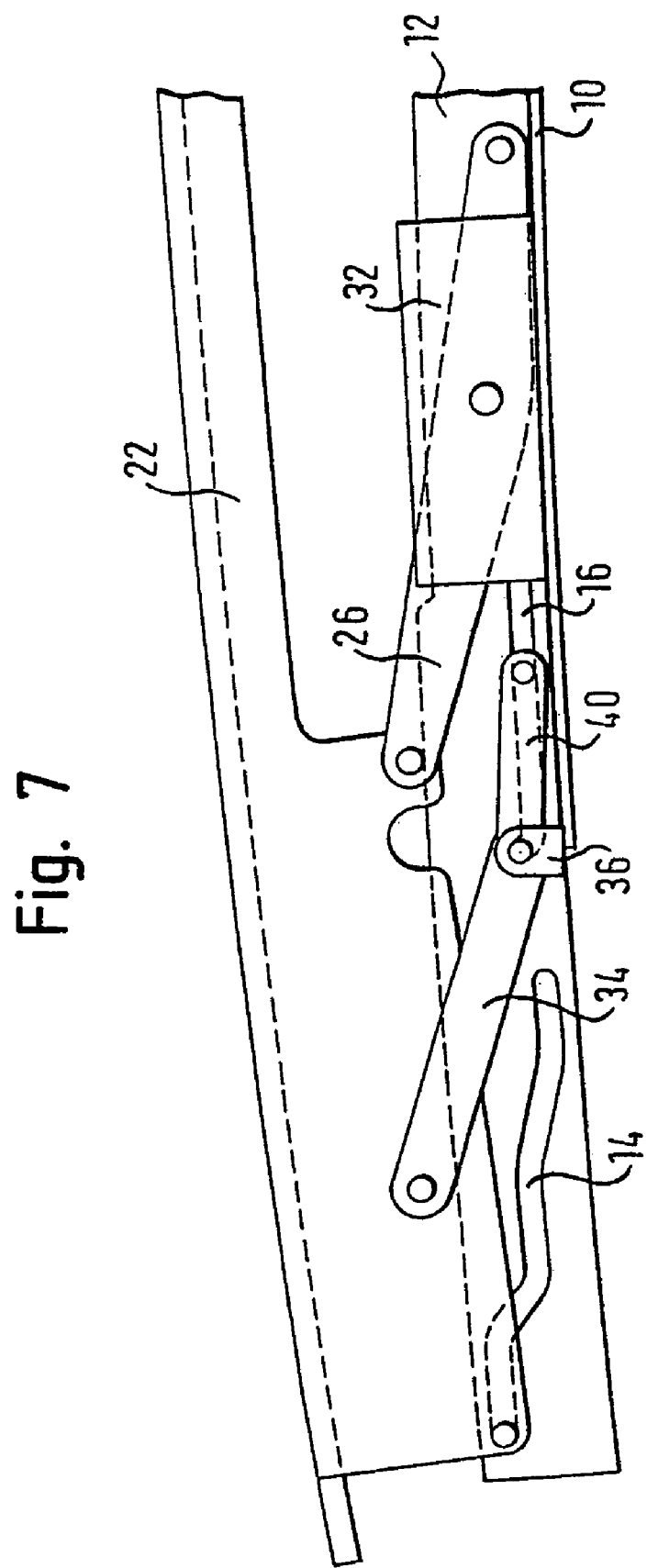
FIG. 7 shows the mechanism of FIG. 6 in a fully open position.

FIGS. 5 through 7 illustrate a second embodiment of the invention. The same reference numerals will be used for the components known from the first embodiment, and in this respect reference is made to the above explanations.

The difference between the first embodiment and the second embodiment is that no separate interlocking between the carriage 12 and the cover support 22 is provided in the second embodiment, as is established with the first embodiment by the locking bolt 44 and the locking hook 46.

In the initial state shown in FIG. 5, where the cover support 22 is in its closed position, the cover support 22 rests on the rear end of the carriage 12. Starting from this position, the cover support 22 can be transferred via the venting position shown in FIG. 6 to the fully open position shown in FIG. 7.

Figure 8:
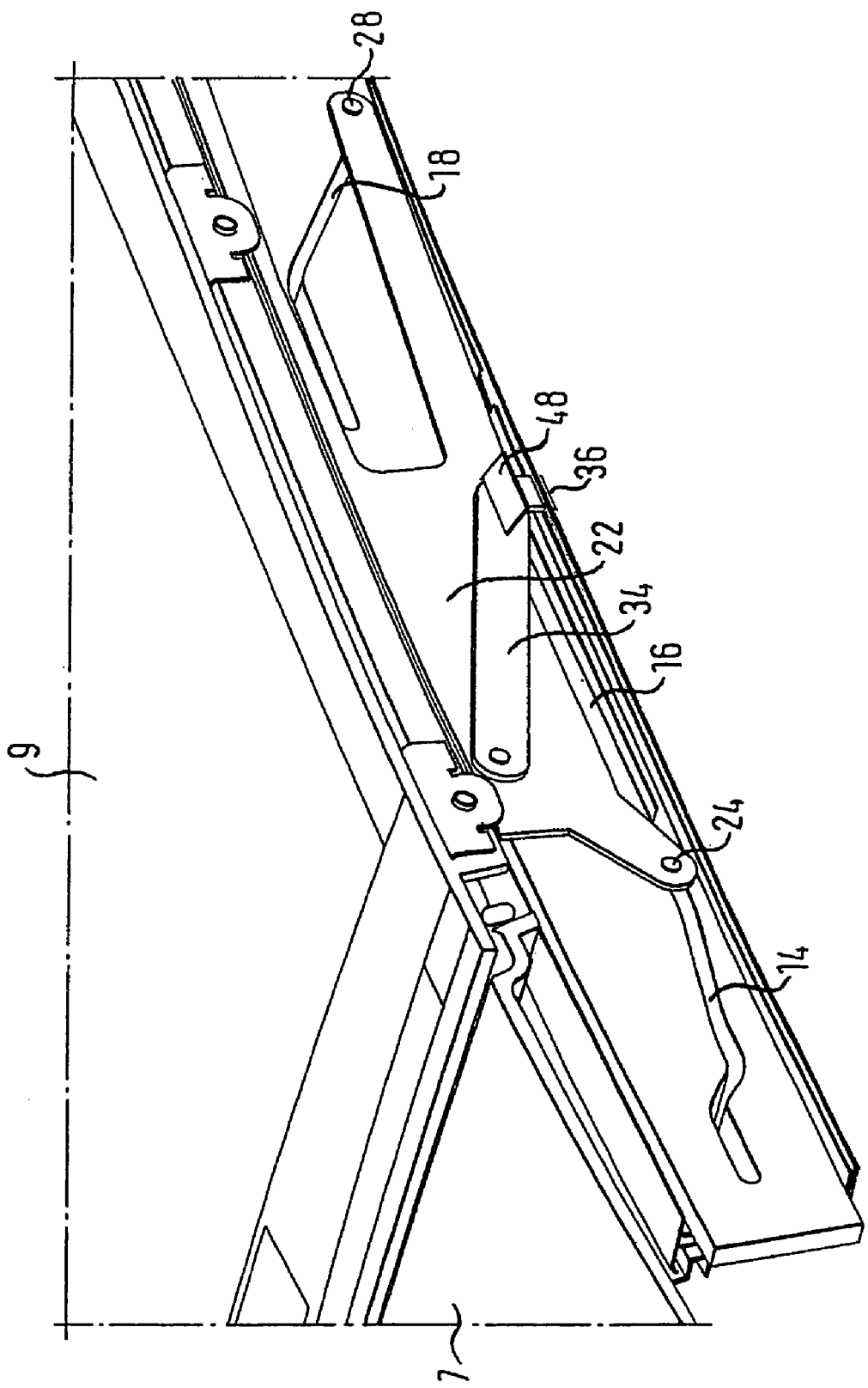
FIG. 8 shows a perspective view of a sliding-tilting roof according to a third embodiment where the mechanism is in the closed position.
Figure 9:
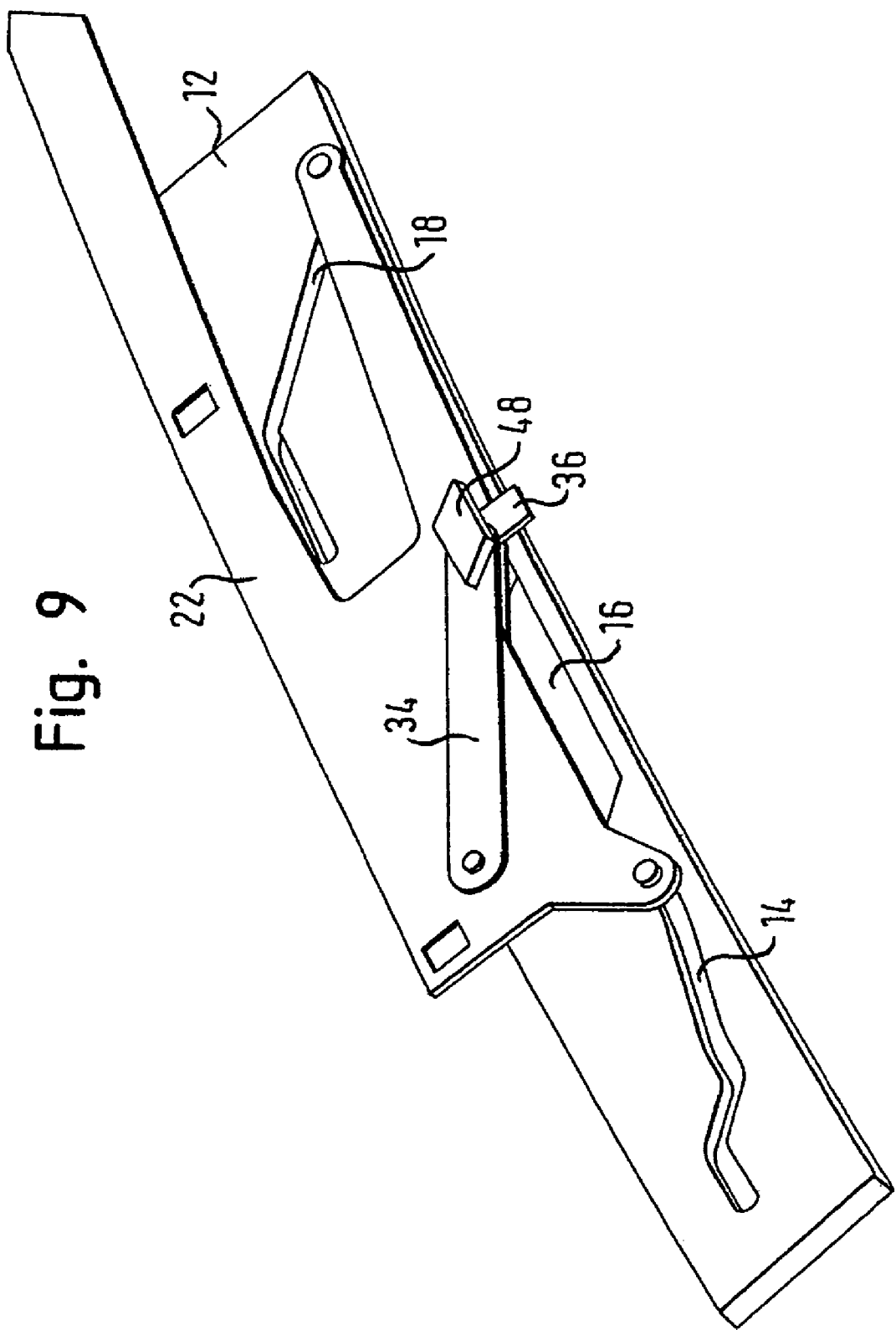
FIG. 9 shows a perspective view of the carriage, the cover support and a latching hook of the mechanism shown in FIG. 8.
Figure 10:
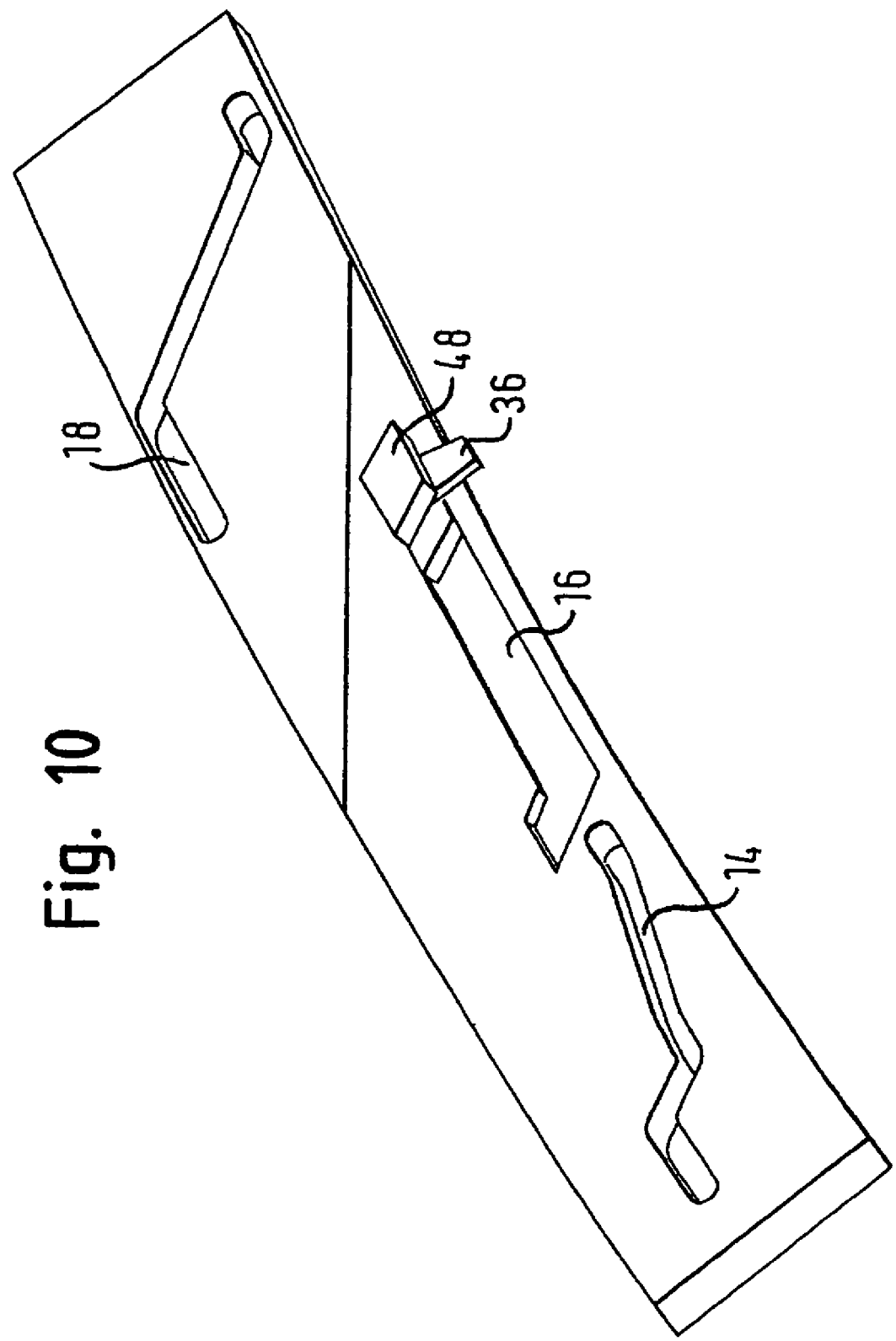
FIG. 10 shows a perspective view of the carriage and the latching hook of the mechanism shown in FIG. 8.

FIGS. 8 to 10 illustrate a third embodiment of the invention. The same reference numerals will be used for the components known from the preceding embodiment, and in this respect reference is made to the above explanations.

The third embodiment differs from the first and second embodiments in that the third embodiment does not use a lifting lever. Instead, the rear end of the cover support 22, as seen in the longitudinal direction of the vehicle, is directly coupled with the lifting slot. Also, the third embodiment differs from the first and second embodiments in that the latching hook 36 has no pivoting lever 40, but instead has two parallelogram-like gliders 48 engaging in the latching slot 16. Because the gliders 48 are firmly connected with the latching hook 36 and guided in the latching slot 16 to be almost free from play, the orientation of the latching hook 36 is ensured to extend vertically in the downward direction.

The mode of operation with the mechanism according to the third embodiment corresponds to that of the first and second embodiments. If the carriage 12 is shifted to the rear starting from the rest position with the cover support 22 closed, the cover support 22 is lifted by the guiding slot 14 and the lifting slot 18. Other than in the first and second embodiments, however, this will be effected without the transmission of the lifting lever, but directly by means of the lifting slot. As seen in the longitudinal direction, the cover support 22 is retained by the coupling lever 34 and the latching hook 36. Shortly before the cover support 22 reaches the end of the guiding slot 14 and the lifting slot 18, the gliders 48 of the latching hook 36 enter the lifting section of the latching slot 16 and lift the latching hook 36 out of the latching recess 42 of the guide rail 10. Thereafter, the cover support 22 can be entrained by the carriage 12 in the longitudinal direction of the vehicle to the rear. Conversely, the cover support will be shifted toward the front by the carriage 12 via the latching hook 36 and the coupling lever 34 until the latching hook 36 can penetrate into the latching recess 42, allowing the cover support 22 to again be held in the longitudinal direction and transferred to its closed position.

All of the embodiments described above share the common advantage that they have a very short constructional length (as seen in the longitudinal direction of the vehicle). This is in particular due to the fact that the latching hook 36 is arranged between the guide pin 24 and the lifting pin 28. An advantage of the first and second embodiments is that they achieve a large amount of vertical travel in the cover support 22 despite having a comparably small overall height because the lifting lever 26 provides the needed transmission ratio. Another advantage of the three embodiments is that all relevant movements (i.e., both the lifting movement of the cover support 22 and the lifting movement of the latching hook 36) are conducted by shifting a single carriage rather than multiple components.

It should be understood that various alternatives to the embodiments of the invention described herein may be employed in practicing the invention. It is intended that the following claims define the scope of the invention and that the method and apparatus within the scope of these claims and their equivalents be covered thereby.

The invention claimed is:

1. A vehicle roof assembly comprising:
   at least one guide rail;
   a monolithic carriage that can be shifted in the at least one guide rail, the monolithic carriage having a lifting slot, a guiding slot and a latching slot; and
   a cover support for bearing a cover of a sliding-tilting roof for a motor vehicle, wherein the cover support is operably coupled to the monolithic carriage via at least one of the lifting slot, the guiding slot, and the latching slot.

2. The vehicle roof assembly according to claim 1, wherein the cover support engages the guiding slot via a pin.

3. The vehicle roof assembly according to claim 1, wherein the guiding slot has a starting section extending substantially parallel to the at least one guide rail, an ascending raising section adjoining the starting section, an intermediate section extending substantially parallel to the at least one guide rail and adjoining the ascending raising section, an ascending lifting section adjoining the intermediate section, and an end section extending substantially parallel to the at least one guide rail.

4. The vehicle roof assembly according to claim 1, wherein the cover support engages the lifting slot via a pin.

5. The vehicle roof assembly according to claim 1, wherein the lifting slot has a starting section extending substantially parallel to the at least one guide rail, an ascending lifting section adjoining the starting section, and an end section extending substantially parallel to the at least one guide rail and adjoining the ascending lifting section.

6. The vehicle roof assembly according to claim 1, further comprising a lifting lever coupled with the cover support and engaging the lifting slot.

7. The vehicle roof assembly according to claim 6, wherein the lifting lever is a two-armed lever and wherein the vehicle roof assembly further comprises a support glider that supports the lifting lever at a point of rotation and is that movably arranged in the at least one guide rail.

8. The vehicle roof assembly according to claim 1, wherein the lifting slot has a starting section extending substantially parallel to the at least one guide rail, a first lifting section extending in a downward direction and adjoining the starting section, an intermediate section extending substantially parallel to the at least one guide rail, a second lifting section extending in a downward direction and adjoining the intermediate section, and an end section extending substantially parallel to. the at least one guide rail and adjoining the second lifting section.

9. The vehicle roof assembly according to claim 1, further comprising a latching hook that can be shifted between a latching position where the latching hook is held on the at least one guide rail and a release position where the latching hook can be moved relative to the at least one guide rail.

10. The vehicle roof assembly according to claim 9, wherein the latching hook engages the latching slot via at least one of a pin and a glider.

11. The vehicle roof assembly according to claim 1, wherein the latching slot has a lost motion section extending substantially parallel to the at least one guide rail and a lifting section ascending in an upward direction and adjoining the lost motion section.

12. The vehicle roof assembly according to claim 9, further comprising a coupling lever connecting the latching hook with the cover support.

13. The vehicle roof assembly according to claim 9, further comprising a pivoting lever connecting the latching hook with a support glider.

14. The vehicle roof assembly according to claim 9, wherein an orientation of the latching hook is guided by the latching slot.

15. The vehicle roof assembly according to claim 1, further comprising a first locking element on the monolithic carriage and a second locking element on the cover support, wherein the first locking element and the second locking element cooperate with each other.

16. The vehicle roof assembly according to claim 15, wherein the first locking element on the monolithic carriage is a locking hook and the second locking element on the cover support is a locking bolt.

17. A carriage for a vehicle roof assembly, comprising:
a monolithic body portion; and
a lifting slot, a guiding slot, and a latching slot formed in the monolithic body portion.

18. The carriage of claim 17, wherein the guiding slot has a starting section extending in a substantially longitudinal direction, an ascending raising section adjoining the starting section, an intermediate section extending in the substantially longitudinal direction and adjoining the ascending raising section, an ascending lifting section adjoining the intermediate section, and an end section extending in the substantially longitudinal direction and adjoining the ascending lifting section.

19. The carriage of claim 17, wherein the lifting slot has a starting section extending in a substantially longitudinal direction, a lifting section adjoining the starting section, and an end section extending in the substantially longitudinal direction and adjoining the lifting section.

20. The carriage of claim 17, further comprising a support glider groove disposed in the carriage.

21. The carriage of claim 17, wherein the lifting slot has a starting section extending in a substantially longitudinal direction, a first lifting section extending in a downward direction and adjoining the starting section, an intermediate section extending in the substantially longitudinal direction and adjoining the first lifting section, a second lifting section extending in the downward direction and adjoining the intermediate section, and an end section extending in the substantially longitudinal direction and adjoining the second lifting section.

22. The carriage of claim 17, wherein the latching slot has a lost motion section extending in a substantially longitudinal direction and a lifting section ascending in an upward direction and adjoining the lost motion section.

* * * * *

UNITED STATES PATENT AND TRADEMARK OFFICE
CERTIFICATE OF CORRECTION

PATENT NO. : 7,229,127 B2 Page 1 of 1
APPLICATION NO. : 10/997481
DATED : June 12, 2007
INVENTOR(S) : Grimm et al.

It is certified that error appears in the above-identified patent and that said Letters Patent is hereby corrected as shown below:

Claim 8, Column 7, line 31: Delete "."

Signed and Sealed this

Twenty-first Day of August, 2007

JON W. DUDAS
*Director of the United States Patent and Trademark Office*